Feb. 9, 1937. W. A. RICHTER 2,069,970
VEHICLE AND ACCESSORY THEREFOR
Filed Nov. 25, 1930 2 Sheets-Sheet 1
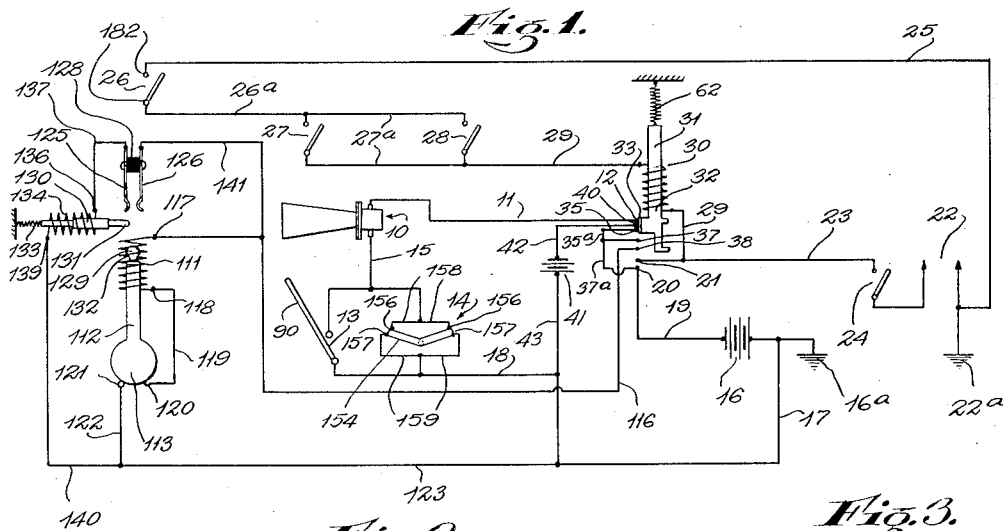
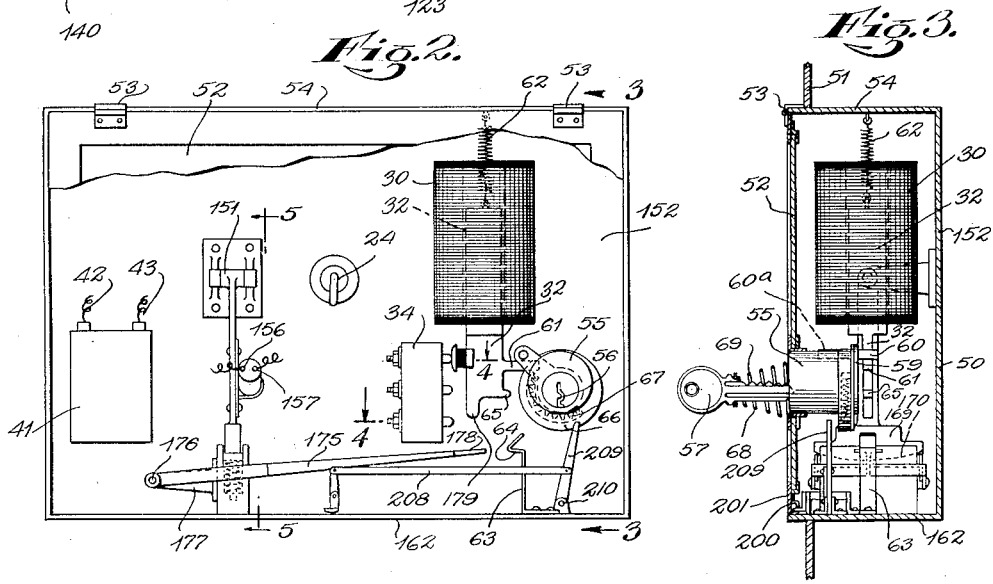
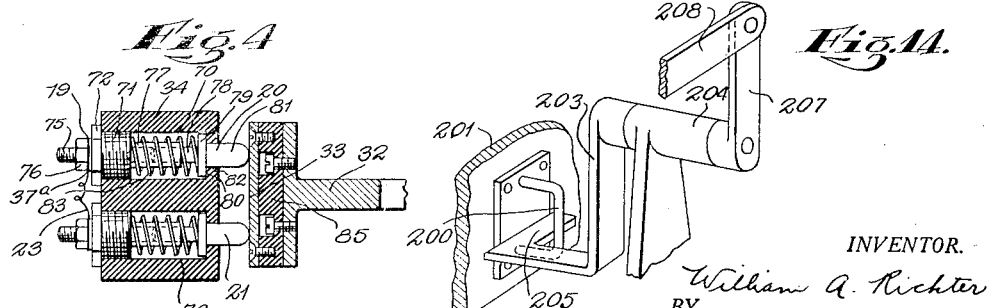
INVENTOR.
William A. Richter
BY
Morris Finchstein
ATTORNEYS.

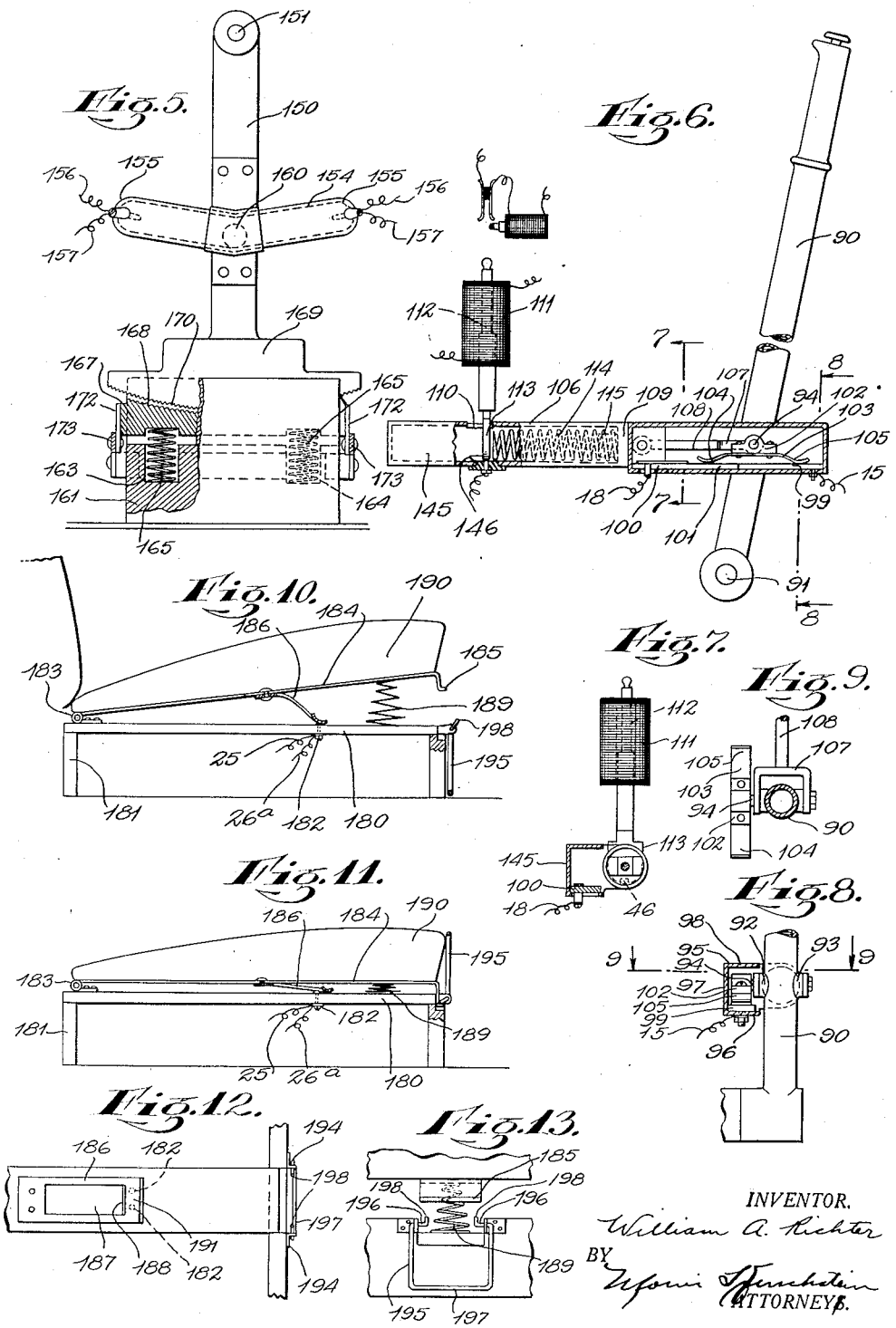

Patented Feb. 9, 1937

2,069,970

UNITED STATES PATENT OFFICE 2,069,970

VEHICLE AND ACCESSORY THEREFOR

William A. Richter, New York, N. Y.

Application November 25, 1930, Serial No. 498,015

10 Claims. (Cl. 177—314)

This invention relates to vehicles and accessories therefor, and is particularly directed to an automobile theft alarm or signal apparatus and the like devices.

An object of this invention is to provide a theft alarm system for vehicles in which the alarm can be actuated only after the operator has gotten off his seat and one of the doors has been opened, as for instance when the operator has gotten out of the car either from the left or right side thereof, provision being made for preventing actuation of the alarm during the ordinary travel of the car.

A further object of this invention is to provide in a theft alarm system of the character described, means for automatically actuating the alarm upon releasing the emergency or parking brake and means for preventing release of the emergency brake by children, said release requiring considerable strength, whereby the alarm may only be actuated upon release of said brake by an adult, for example, a thief. In accordance with my invention, means is further provided for permitting normal operation of the emergency brake, during the ordinary operation of the car.

A still further object of this invention is to provide means for sounding the alarm upon tilting the automobile, as for instance, when surreptitiously towing away the parked car without releasing the emergency brake.

Still another object of this invention is to provide means for preventing actuation of the alarm system even when the operator gets off his seat and opens one of the front doors, as for instance when the operator leaves the car for a short time and does not wish the alarm system to be set.

Another object of this invention is to provide in a theft alarm system of the character described, wherein the ignition switch is actuated by a key, means for automatically projecting the key from the dashboard upon releasing finger pressure therefrom, to prevent the operator from leaving the key remaining on the dashboard, as for instance upon leaving the car, after parking the same, whereby unauthorized starting of the car by use of the key will be prevented.

A still further object of this invention is to provide a compact theft alarm apparatus of the character described, which may be housed in a unitary casing mounted on the dashboard and provided with means to permit easy access to the parts thereof for replacement or adjustment, which shall be comparatively inexpensive to manufacture, easy to manipulate and install, positive in operation, and withal practical and efficient to a high degree.

Other objects of this invention will in part be obvious and in part hereinafter pointed out.

The invention accordingly consists in the features of construction, combinations of elements and arrangement of parts which will be exemplified in the construction hereinafter described, and of which the scope of application will be indicated in the following claims.

In the accompanying drawings, in which is shown one of the various possible illustrative embodiments of this invention, Fig. 1 is a wiring diagram illustrating the electrical connections of the theft alarm system embodying my invention;

Fig. 2 is a front elevational view of structure forming part of the theft alarm system and mounted on a dashboard;

Fig. 3 is a cross-sectional view taken on line 3—3 of Fig. 2;

Fig. 4 is a cross-sectional view taken on line 4—4 of Fig. 2;

Fig. 5 is an enlarged, cross-sectional view taken on line 5—5 of Fig. 2;

Fig. 6 is a side, elevational view of the emergency brake switch system with parts broken away to show the interior construction;

Fig. 7 is a cross-sectional view taken on line 7—7 of Fig. 6;

Fig. 8 is a cross-sectional view taken on line 8—8 of Fig. 6;

Fig. 9 is a cross-sectional view taken on line 9—9 of Fig. 6;

Fig. 10 is a side-elevational view of the seat switch;

Fig. 11 is a side, elevational view of the structure shown in Fig. 10, but showing the seat down and the switch open and illustrating the position of the parts for preventing closing of the seat switch;

Fig. 12 is a top plan view of the seat switch;

Fig. 13 is an elevational end view of the structure shown in Fig. 10; and

Fig. 14 is a perspective, detailed view of the panel release mechanism.

Referring now in detail to the drawings, Fig. 1 shows a wiring diagram illustrating the electrical connections of various parts of the theft alarm system embodying the invention, and the relation thereof to parts of the automobile, in diagrammatic form. The system generally comprises an alarm 10 such as a horn, bell, light or any other suitable audible or visible electrically actuated alarm or signal. The alarm 10 may be connected by a wire 11 to a fixed contact 12 mounted on an insulating block 34. The alarm is further electrically connected in the manner hereinafter appearing, to an emergency brake switch 13 and to a gravity operated switch 14, the brake switch and the switch 14 being connected in multiple with each other and in series with the alarm device 10, by means of wiring 15 and in series with the usual automobile storage battery 16 by means of wires 17 and 18. The battery 16 is connected through wiring 19 to a fixed contact 20 mounted on said block 34. To a fixed contact 21, likewise mounted on said block, and related to contact 20 in the manner hereinafter appearing, is connected, one pole of the usual ignition system 22, by wiring 23, an emergency hand switch 24 being interposed in said wiring 23. The other pole of the ignition system is grounded as at 22a and connected by wiring 25 to a seat switch 26 adapted to be closed in the manner hereinafter described, when the automobile operator gets off his seat. The switch 26 is connected by wiring 26a in series with a pair of switches 27 and 28, the latter switches being connected in multiple with each other by wiring 27a and adapted to be closed upon opening the left and right front doors respectively, of the automobile.

The switches 27 and 28 may be of any suitable construction (not shown) and are connected by wiring 29 in series with the fixed contact 21. Interposed in the wiring 29 however, is an electromagnetic coil 30 forming part of an electromagnet and adapted to energize the armature 31 of a movable switch member 32 described hereinafter in greater detail.

The member 32 is provided with a comparatively wide metallic strip 33 for the purpose hereinafter appearing. Mounted on the block 34, is a fixed contact 35, the strip 33 being adapted to interconnect or span the contacts 12 and 35 when said member 32 is in the position illustrated in Fig. 1. Mounted on said block 34 is an intermediate pair of spaced fixed contacts 37 and 38, likewise adapted to be spanned by the strip 33, as for example, upon moving the member 32 downwardly, for the purpose hereinafter appearing. The fixed contacts 20 and 21 are likewise adapted to be spanned by the strip 33 when the member 32 is in its downmost position. The contacts 35 and 37 are interconnected by wiring 35a and the contact 37 is interconnected to the contact 20 by wiring 37a. Thus, both contacts 35 and 37 are interconnected thru wiring 19 directly to the battery 16.

Mounted on said block 34 is still another fixed contact 40 disposed between the contacts 12 and 35 so that when the member 32 is in its upward position for connecting said contacts 12 and 35, the contact 40 will also be connected to said pair of contacts. An emergency or auxiliary battery 41 preferably composed of dry cells and mounted in the manner hereinafter appearing, may be connected by wiring 42 to said fixed contact 40 and by wire 43 to the wire 18, whereby when the member 32 is in its upward position, as shown in Figs. 1 and 2, for setting the alarm, the auxiliary battery 41 will be connected in multiple to the battery 16, said auxiliary battery being connected thru wiring 42, contact 40, strip 33, contact 35 and wiring 35a, 37a and 19 to one pole of the storage battery 16, the other pole of said storage battery being connected by wiring 17 and 43 to said auxiliary battery.

As shown in Figs. 2 and 3, the member 32 and the coil 30 are housed within a box or casing 50 adapted to be mounted on the dashboard 51. The front of the box is adapted to be closed by a panel or door 52, preferably made of glass to permit viewing of the interior of the box, and hinged as at 53 to the top wall 54 of said box. Said door or panel 52 is preferably substantially flush with the dashboard.

Means is provided for moving the member 32 downwardly from the position shown in Figs. 1 and 2. To this end a key tumbler 55 is mounted on said panel 52 and extends inwardly therefrom, said tumbler being provided with the usual key opening 56 at the front thereof. A key 57 is adapted to be inserted within the opening 56 for turning a disc or plate 59 counterclockwise (looking at Fig. 2), the disc 59 being provided with a rearwardly extending pin 60 for the purpose hereinafter explained. The member 32 is provided with a projection 61 adapted to be engaged by the pin 60, so that movement of the disc 59 in a counterclockwise direction as shown in Fig. 2 causes downward sliding movement of said member 32. A tension spring 62 serves to normally maintain the member 32 in its upmost position, said spring being tensioned on moving said member 32 downward. For retaining the member 32 in its lowermost position, there is provided a plate spring 63 having a hooked portion 64 adapted to engage a lug 65 formed adjacent the lower end of said member 32. The spring 63 is preferably of sufficient strength to retain the member 32 in its downmost position against the tension of the spring 62.

Means is provided for automatically ejecting the key 57 from the tumbler upon releasing finger pressure on the key after the member 32 has been moved down to its lowermost position. To this end, a curved channel or housing 66 is formed adjacent the tumbler 55, and mounted within said channel is a small coil compression spring 67 adapted to be compressed upon rotating the disc 59, so that when the finger pressure is released from the key, the compressed spring 67 will rotate the disc 59 back to the normal position shown in Fig. 2; and when the key 57 is in said position, the same is adapted to be ejected from the key-hole by means of a coil compression spring 68 attached at one end 68 thereof to the key and disposed about the forward end of said key. Thus the spring 68 is compressed when putting the key into the key-hole, and release of finger pressure will permit the spring 68 to force the key out of the key-hole. The operator is thus prevented from inadvertently leaving the key 57 within the key-hole.

When the member 32 is in the lowermost position thereof the fixed contacts 20, 21 will be spanned by the metal strip 33 and the ignition circuit for the car will then be closed to permit the car to be operated. One side of the ignition circuit 22 is obviously connected to one pole of the battery 16 through the switch 24, wire 23, a strip 33 and wire 19, the other pole of the battery being grounded as at 16a as is the other side of the ignition circuit, shown at 22a.

In Fig. 4 there is illustrated the pair of contacts 20 and 21 mounted on the insulating block, 34, the pair of contacts 37 and 38 and the pair of contacts 12 and 35 being similar in construction except that the additional contact 40 is interposed between the pair of contacts 12 and 35. The block 34 may be provided with a pair of parallel screw threaded openings 70, each receiving a screw threaded member 71 having a nut or head 72 in the outer side thereof, and a reduced screw threaded member 75 extending outwardly therefrom. A nut 76 is screwed on the screw threaded member 75 for clamping the proper wires to the member 71. Extending within each of the openings 70 is a tubular extension 77 projecting from the member 71, slidably receiving a pin 78 therein. Each pin 78 is provided with a flange 79 contacting the end wall 80 of the opening 70. A contact portion 81 projecting from the flange 79 slidably extends through an opening 82 within said block. A spring 83 is interposed between the flange 79 and the member 71, said spring being compressed upon moving the strip 33 into contact with contact portion 81. This construction permits the member 32 to be moved upwardly and downwardly, and insures a good contact between the strip 33 and the various fixed contacts enumerated above. It will be noted that the strip 33 is insulated by means of a member 85 from the member 32.

When the operator stops the car, pulls the emergency or parking brake lever, gets off the seat and leaves the car by either the left or the right front door thereof, the switch 26 will be closed and either the switch 27 or 28 will be closed, whereby the circuit through the coil 30 will be completed and said coil energized. The circuit through said coil includes wiring 29, contacts 21 and 20 bridged by strip 33, wiring 19, the battery 16, the ground, switch 27 or 28, switch 26 and wiring 25 which is grounded at 22a. When the coil 30 is energized the armature 31 will be drawn upwardly, the member 32 being released from the spring hook 64 and the spring 62 retaining the member 32 in its uppermost position. In this position the alarm 10 is in circuit with the battery 16 and with the auxiliary battery 41 thru contacts 12, 40 and 35 (now bridged by strip 33) and through the emergency brake switch 13 and the switch 14. Although the alarm circuit is now set, the alarm will not go off until the emergency brake switch is closed or the switch 14 is closed.

Means is provided for closing the emergency brake switch upon releasing the emergency brake lever 90. The brake lever 90 is pivoted as at 91. Said lever may be provided somewhat above the pivot point thereof, with a pair of outwardly extending bosses 92 and 93. Extending through said bosses is a shaft 94 projecting to one side of the brake lever into an elongated channel shaped housing 95. Said housing 95 is provided with a bottom wall 96, side wall 97 and a top wall 98. Fixed to the bottom wall 96 on the inside of the housing is a pair of conducting strips 99 and 100 separated by an intermediate insulating strip 101. The wire 15 may be attached to one of the conducting strips 99 and the wire 18 connected to the other of the conducting strips 100. A sleeve member 102 made of insulating material is rotatably mounted on the shaft 94, and attached to the underside of said sleeve member 102 is a spring member 103 having arms 104 and 105 slidably pressing down against the strips 99, 100, and 101.

In the position shown in Fig. 6 it will be noted that the arm 105 contacts the conducting strip 99, whereas the other arm 104 contacts the insulating strip 101. In this position, the switch 13 is open and the alarm will not go off. However upon moving the brake lever forwardly to release the same, the arm 104 will slide onto the conducting strip 100 for electrically interconnecting conducting strips 99 and 100 and closing the circuit through the brake switch 13.

To prevent the brake lever from being released by children, means is provided to retard movement of the brake lever whereby the same may be moved to release position, only by exertion of considerable force, as for instance, when an adult thief releases the lever to permit him to move the car. To this end, a tubular housing 106, aligned with the brake lever 90 extends forwardly therefrom. A forked strap member 107 is hinged to the shaft 94 at both sides of the bosses 92 and 93, and extending forwardly from said strap portion 107 is a rod 108 pivoted to a piston 109, slidably mounted within the tubular housing 106 adjacent one end thereof. Said tubular housing is provided with an opening 110 in the top thereof for the purpose hereinafter appearing.

Mounted in any suitable manner above the opening 110 is an electro-magnetic coil 111 in which there is slidably mounted an armature 112. At the lower end of the armature 112 there is fixed a disc 113 transverse to the tubular member 106 and in the downward position of the member 112, illustrated in Fig. 6, the disc 113 is disposed within the tubular member and extends through the opening 110 thereof. A coil compression spring 114 is fixed at one end 115 thereof, in any suitable manner, to the piston 109. It will now be noted that the lever 90 can only be moved against the pressure of the spring 114 to the released position. The spring is preferably of such dimension as to require an adult's strength to move the lever to released position. Thus, children will not be able to release the brake and actuate the alarm. Furthermore, the spring 114 serves to move the lever 90 to the setting position as shown in Fig. 6 upon releasing pressure on said lever. Thus, should a thief move the lever to released position, and upon hearing or seeing the alarm signal, take his hand off the emergency brake, the same will automatically move under the influence of the spring 114 to the setting position, to prevent further movement of the car. As long as the brake is in released position, the alarm is actuated.

Means is provided for permitting normal operation of the brake lever 90 during the ordinary travel of the car. Thus, during the ordinary travel of the car, the member 32 is in the downmost position, having been moved downwardly by the key 57. The downward movement of the member 32 prior to starting the car will obviously move the strip 33 across the fixed contacts 37 and 38. The contact 38 is connected through wiring 116, to one side 117 of the coil 111, the other side 118 of said coil being connected through wiring 119 to a fixed contact 120 attached to the tubular housing 106 and adapted to be contacted by the disc 113 when said disc is in the downward position thereof. A second fixed contact 121, spaced and normally insulated from contact 120, is likewise fixed to the tubular housing and adapted to be contacted by the disc 113. The contact 121 is connected by wiring 122 and 123 to the wire 17 and hence to one side of the battery 16, the other side of the battery 16 being connected through wiring 19 and 37a to the contact 37. Thus the circuit through the coil 111 is completed upon moving the member 32 downwardly. By energizing said coil 111, the armature 112 is attracted upwardly for moving the disc 113 out of the tubular housing 106 and out of contact with the fixed contacts 120 and 121. A pair of spaced spring contacts 125 and 126 insulated from each other by insulating member 128 are adapted to engage a rounded knob or head 129 at the upper end of said armature 112, when the armature is in the upper position thereof. For retaining the disc 113 in the upper position thereof, there is provided an armature 130 slidably mounted in the direction transverse to the armature 112, the tip 131 of said armature 130 being adapted to engage a notch 132 formed on the knob 129. A coil compression spring 133 serves to press the tip 131 into said notch 132 for preventing downward movement of the disc. An electro-magnetic coil 134 is wound about the armature 130 and one side 136 of said coil is connected by wiring 137 to one of the spring fingers 125. The other side 139 of the coil 134 is connected through wiring 140 to the wire 123 and hence to one side of the battery 16. The other spring finger 126 is connected through wiring 141 to the wire 116 and hence to the fixed contact 38. Thus with the disc 113 lifted, the lever 90 may be moved forwardly without opposition, the spring 114 merely passing freely to the forward end 145 of the tubular member 106.

However, when the driver gets off his seat and leaves the car and the member 32 is moved upwardly (as explained above), the contacts 37 and 38 are again bridged by the strip 33 and the circuit through the coil 134 will be closed momentarily by reason of the contact of the knob 129 with the spring finger 125, 126. Upon energizing the coil 134, armature 130 is moved to the left, looking at Fig. 1, against compression spring 133, to release the disc 113 and permit the same to drop downwardly into the tubular housing 106. A projection 146 is formed at the lower end of the disc 113 to prevent the disc from moving between the convolutions of the spring 114, as for example, should the lever 90 not be pulled to setting position before the driver gets out of the car.

The gravity operated switch 14 constitutes means to prevent the car from being towed away without releasing the brake, as for example, by lifting the front or the rear of the car onto a towing vehicle, and dragging the car with the emergency brake set. To this end, said switch 14 comprises a pendulum-like member 150, pivoted on a knuckle 151 fixed to the rear wall 152 of the box 50, and swingingly depending from said knuckle. Attached to an intermediate portion of said member 150 in any suitable manner is a tube 154 extending upwardly and outwardly on both sides of said member 150 and disposed longitudinally of the car. Attached to each of the ends 155 of said tube are a pair of spaced insulated contacts 156 and 157, connected by wires 158 and 159 to the wire 15 and the wire 18, respectively, the contacts 156 and 157 on one side of the tube thus being connected in multiple to the contacts 156, 157 on the other side of the tube. A metal ball 160 is disposed within the tube 154 adapted to roll to one side or the other thereof upon tilting the car when the member 150 is fixed. The ball 160 is adapted to electrically interconnect the contacts 156, 157 on one side or the other of the tube depending upon whether the front or rear of the car is tilted.

However, during normal operation of the car the member 150 swings with the car and is therefore normally maintained in vertical position even when the car is traveling up or down a hill. Means is provided, however, for fixing the member 150 in upright position when the driver stops the car and gets out of said car. Said means comprises a block 161 fixed at the bottom wall 162 of the box 50 and having the sockets 163, 164, each receiving a coil compression spring 165. Mounted on said compression spring 165 and adapted to be slidably moved upwardly by said spring, is a member 167 having a curved serrated surface 168 on the upper face thereof. At the lower end of the member 150 there is provided a member 169 having a curved serrated undersurface 170. Thus, when the car is parked and the driver is out of the car, the member 32 is in the upper position thereof, and the member 167 is moved upwardly into contact with the member 169, the serrated surfaces 168 and 170 being interlocked and the member 150 fixed in upright position, no matter at what angle the car happens to be with respect to the horizontal. Should the car thereafter be tilted, either from the front or from the back, as for instance, in attempting to steal the car by towing the same away without releasing the parking brake, the ball 160 will roll to the front or rear of the tube 154 and close the contacts 156, 157 and complete the circuit to the alarm 10. During normal operation of the car, however, the member 32 having been moved downwardly by actuation of the key 57, the member 167 is maintained in a manner hereinafter described, out of contact from the member 169 to permit member 150 to swing freely about the knuckle 151. The member 167 is provided with projections 172 to which there are pivoted the forked portions 173 of an arm 175. The rear ends of the forked portions 173 are pivoted as at 176 to brackets 177 fixed within box 50 in any suitable manner. The arm 175 is provided with a projection 178 disposed directly beneath the lower end 179 of the member 32, so that upon lowering said member 32 to start the car, the projection 179 engages the projection 178 and pivotally moves the arm 175 about the pivot points 176. This movement causes downward movement of the member 167 against springs 165 for releasing the said member from the member 169. In this position, the member 150 is maintained in constant vertical position and the ball 160 remains in the center of the tube to prevent actuating the alarm.

The seat switch 26 comprises an insulated member 180 attached across the top of the seat frame 181. Fixed to said member 180 are a pair of fixed contacts 182 and pivoted to the rear of the seat 181 and attached to the underside of the seat cushion 190, is a member 184 formed of insulating material and provided with a downwardly and outwardly hooked portion 185 adapted to extend down over the front of the seat frame, as shown in Fig. 11. Attached to the underside of the said member 184 is a metal member 186 having a cut out portion 187 and an upwardly curved inner lip portion 188 at the forward end thereof. A coil compression spring 189 mounted on member 180 serves to normally maintain the cushion seat 190 and the member 184 in upwardly inclined position. In said position the member 186 is downwardly curved and the forward edge portion 191 thereof engages and bridges the contacts 182 for closing the switch 26. When the driver is seated on the seat, however, as shown in Fig. 10, the forward portion 191 of the member 186 moves forwardly and slides off the contacts 182 which are then disposed within the cutout portion 187, the switch 26 then being in open position.

Means is provided for retaining the switch 26 in open position even when the driver gets off the seat, as for example, when desiring to leave the car only for a few minutes and not wishing the alarm to be energized. To this end there is pivoted to the front of the seat, as on spaced bearings 194, a U-shaped member 195 having portions 196 extending through suitable openings in said bearings 194, and a handle portion 197 interconnecting said portion 196. Said member 195 is further provided with outwardly extending end portions 198 adapted to contact the hook 185 when said member 195 is swung to the position shown in Fig. 11, to maintain the member 184 in downward position and the switch 26 open. Thus, before getting off the seat, the driver, if he desires, the alarm not to go off when he leaves the car, need merely grasp the handle 197 and swing the member 195 to the position shown in Fig. 11. Upon returning to the car the driver noticing the handle member 197 projecting above the seat will swing the same back to the position shown in Fig. 13. Thus, upon leaving the car subsequently, as for instance, when parking the same, the switch will be automatically closed as described above.

Releasable means is provided for closing the panel 52 of box 50. To this end a loop or eye 200 is fixed to the lower edge 201 of said panel 52. A member 203 is pivotally fixed to a bearing 204 and provided with a hooked end 205 adapted to engage within said loop 200 for retaining the panel in closed position. Means is provided for releasing said panel. To this end the member 203 is formed with an upstanding arm 207 to the upper end of which is connected a link 208. The opposite end of said link 208 is connected to an arm 209 pivoted at the lower end thereof as at 210 to the bottom wall 162 of the box 50. For releasing the panel, the key 57 is merely turned in the clockwise direction as shown in Fig. 2, for moving a pin 60a projecting from disc 59, against the upper end of the arm 209. Said pin 60a is thus adapted to pivotally move the arm 209 for moving the link 208 and causing rotation of the member 203 for releasing the hooked end 205 thereof from the loop 200, and permitting the panel 52 to be opened. Continued movement of the disc 59 in clockwise direction will cause pin 60a to engage the underside of the projection 61 for lifting the member 32, should the latter not be lifted for any reason by the coil 30.

It will be noted that the auxiliary battery 41 may be mounted within the box 50 to permit the same to be viewed by the operator. The emergency switch 24 may also be mounted on the panel 52 in any suitable manner.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth, or shown in the accompanying drawings, is to be interpreted as illustrative and not in a limiting sense.

Having thus described my invention, I claim as new and desire to secure by Letters Patent:

1. In combination with an automobile having an electric alarm, means for actuating said alarm including a switch, an emergency brake and an emergency brake lever connected to said switch for closing the same upon releasing said brake lever, means for yieldingly opposing release of said lever and means for rendering said opposing means inoperative.

2. In an automobile, an electrically operable signal device, a circuit or said device, a switch interposed in said circuit, an emergency brake lever having means for closing said switch upon moving said lever to release position, a spring attached to said lever, a member and means for moving said member into the path of said spring to yieldingly oppose release of said lever and closing of said switch whereby actuation of said alarm is rendered more difficult.

3. In an automobile, an electrically operable signal device, a circuit for said device, a switch interposed in said circuit, an emergency brake lever having means for closing said switch upon moving said lever to release position, a spring attached to said lever, a member adapted to be moved into the path of said spring, and means for moving said member into the path of said spring to yieldingly oppose release of said lever and closing of said switch whereby actuation of said alarm is rendered more difficult.

4. In an automobile, an electrically operable signal device, a circuit for said device, a switch interposed in said circuit, an emergency brake lever having means for closing said switch upon moving said lever to release position, a spring attached to said lever, a member adapted to be moved into the path of said spring, means for moving said member into the path of said spring to yieldingly oppose release of said lever and closing of said switch, and means for automatically moving said member out of the path of said spring.

5. In combination, an automobile, an electric alarm mounted thereon, and means for automatically actuating said alarm upon tilting said automobile, said means including an electric circuit for said alarm, a switch having a movable member interposed in said circuit, a member pivotally mounted at the upper end thereof on a transverse axis for free swinging movement on said automobile while said automobile is in operation, a second switch interposed in said circuit adapted to be closed by said pivoted member, means for locking said member against pivotal movement, said first switch having means operable by said movable member to release said locking means to permit free swinging movement of said member.

6. In combination, an automobile having a dashboard, a housing on said dashboard, a panel hinged to said housing for closing the same and disposed substantially flush with respect to said dashboard, key actuated switch mechanism, including a key tumbler mounted on said panel, an alarm, means controlled by said mechanism for actuating said alarm, said means including a circuit having a second switch means on said automobile for closing said switch, means for latching said panel to said housing and means associated with said tumbler for unlatching said panel.

7. In combination with an automobile having an electric alarm, means for actuating said alarm including a switch, an emergency brake lever connected to a movable element of said switch for closing the same upon releasing said brake, spring means for yieldingly opposing release of said lever, and means for rendering said opposing means inoperative.

8. In combination, an automobile having an ignition circuit, an electric signal device mounted thereon, an electric circuit for said device, an ignition switch interposed in said circuit and in said ignition circuit, a part of said switch being movable for opening said circuit and closing the ignition circuit of the automobile to permit the same to be operated, a pendulum-like member pivotally mounted on said automobile and adapted for free swinging movement, a second switch on said pivoted member and interposed in said circuit, means for locking said pivoted member against swinging movement, said ignition switch having means to release said locking means to permit the pivoted member to swing freely upon moving said ignition switch to open said first circuit and close the ignition circuit, and means for moving said ignition switch into position for closing said first circuit and opening said ignition circuit, and to permit said locking means to lock said pivoted member.

9. In combination, an automobile, an electric alarm mounted on the automobile, means for automatically actuating said alarm upon tilting said automobile longitudinally, said means including an electrical circuit for said alarm, a switch having a movable member interposed in said circuit, a member pivoted on said automobile for free swinging movement and normally in vertical position, means for locking said pivoted member against pivotal movement, a second switch interposed in said circuit adapted to be closed when said pivoted member is locked against pivotal movement and said automobile is tilted and adapted to remain open when said pivoted member is free to swing and in normal vertical position, said movable switch having means to cooperate with said locking means to release same to permit free swinging movement of said pivoted member.

10. The combination with an automobile, an electrically operated signal device, a source of current and a circuit including said signal and source, a switch in said circuit, means on said automobile, movable as an incident to the operation thereof, for moving said switch to closed-circuit position, a second switch in said circuit, including a movable contact member and a magnetic member, a coil for operating said magnetic member, spring means normally holding said members in a position to cause said movable contact member to close said circuit, resilient latch means cooperating with the said members for holding said contact in circuit opening position against the tension of said spring, key operated means for moving said movable members to latching position and freeing them for unlatching operation, and means, automatically operated by the vacating of the driver's seat and the opening of a door, for energizing said coil to operate said members to release them from the latch and move them to circuit-closing position.

WILLIAM A. RICHTER.